US011219888B2

(12) United States Patent
Traving et al.

(10) Patent No.: US 11,219,888 B2
(45) Date of Patent: Jan. 11, 2022

(54) METHOD FOR PREPARING AND PROCESSING CATALYST SOLUTIONS

(71) Applicant: Covestro Intellectual Property GmbH & Co. KG, Leverkusen (DE)

(72) Inventors: Michael Traving, Burscheid (DE); Holger Rosellen, Leverkusen (DE); Salvatore Manzelli, Troisdorf-Spich (DE); Cosimo Calandrelli, Krefeld (DE); Stephan Reimer, Zülpich (DE); Frank Richter, Leverkusen (DE); Joerg Kolle, Kerpen-Horrem (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 16/937,991

(22) Filed: Jul. 24, 2020

(65) Prior Publication Data

US 2021/0023544 A1    Jan. 28, 2021

(30) Foreign Application Priority Data

Jul. 26, 2019    (EP) .................................... 19188548

(51) Int. Cl.
| | | |
|---|---|---|
| B01J 35/12 | (2006.01) | |
| B01J 31/02 | (2006.01) | |
| B01J 31/22 | (2006.01) | |
| C08G 18/24 | (2006.01) | |

(52) U.S. Cl.
CPC ........... B01J 35/12 (2013.01); B01J 31/0211 (2013.01); B01J 31/0228 (2013.01); B01J 31/223 (2013.01); B01J 31/2243 (2013.01); B01J 2531/42 (2013.01); C08G 18/24 (2013.01)

(58) Field of Classification Search
CPC ............. C08G 18/242; C01B 31/0211; C01B 31/0228; C01B 31/12; C01B 31/223; C01B 31/2243; C01B 2531/42; B01J 31/0211; B01J 31/0228; B01J 31/12; B01J 31/223; B01J 31/2243; B01J 2531/42

See application file for complete search history.

(56) References Cited

U.S. PATENT DOCUMENTS

| | | | |
|---|---|---|---|
| 8,946,372 B2 | 2/2015 | Richter et al. | |
| 9,079,924 B2 | 7/2015 | Lehmann et al. | |
| 9,416,215 B2 | 8/2016 | Krause et al. | |
| 10,773,243 B2 * | 9/2020 | Zhou | ..................... B01J 23/14 |
| 10,815,330 B2 * | 10/2020 | Grahl | .................... C08G 18/246 |
| 2015/0240024 A1 | 8/2015 | Richter et al. | |
| 2015/0252138 A1 | 9/2015 | Richter et al. | |
| 2015/0252638 A1 * | 9/2015 | Richards | ............... E21B 33/138 |
| | | | 166/292 |
| 2019/0070589 A1 | 3/2019 | Zhou et al. | |
| 2019/0135968 A1 | 5/2019 | Grahl et al. | |

FOREIGN PATENT DOCUMENTS

| | | |
|---|---|---|
| EP | 2698200 A1 | 2/2014 |
| EP | 2772496 A1 | 9/2014 |
| EP | 2990381 A1 | 3/2016 |
| WO | 20140131750 A1 | 9/2014 |

OTHER PUBLICATIONS

"Decoloring Carbo" http://www.pitt.edu/~bandik/organicweb/decolorcarbon.html#:~:text=Decolorizing%20carbon%2C%20also%20called%20activated,colored%20molecules%20may%20become%20adsorbed. (Year: 1999).*
Donau Carbon, "Aktivkohle in der chemischen Industrie—Reinigung von Fluessigkeiten, Abluft und Abwasser", Jan. 1, 2020, XP 0555659489.
J. Organomet. Chem. 2009, 694, pp. 3184 to 3189.
Chem. Heterocycl. Comp. 2007, 43, pp. 813 to 834.
Indian J. Chem. 1967, 5, pp. 643 to 645.

* cited by examiner

*Primary Examiner* — David M Brunsman
(74) *Attorney, Agent, or Firm* — John E. Mrozinski, Jr.

(57) ABSTRACT

Provided is a method for preparing a solution B comprising at least one catalyst in at least one second solvent, comprising at least the following steps of (A) providing a solution A comprising the at least one catalyst in at least one first solvent, (B) treating the solution A from step (A) with activated carbon, (C) removing the activated carbon from the solution A, and (D) exchanging the at least one first solvent in solution A for at least one second solvent in order to obtain the solution B comprising the at least one catalyst in at least one second solvent, to a solution of at least one catalyst in at least one second solvent, obtainable by the method according to the invention, to the use of this solution for preparing a composition comprising the at least one catalyst, the at least one second solvent, at least one polyisocyanate and at least one NCO-reactive compound, to the use of this composition for producing a single-layered or multi-layered coating system and a corresponding process.

14 Claims, No Drawings

US 11,219,888 B2

METHOD FOR PREPARING AND PROCESSING CATALYST SOLUTIONS

CROSS REFERENCE TO RELATED APPLICATIONS

The present application claims priority under the Paris Convention to European Application No. 19188548.2, filed Jul. 26, 2019, the entire contents of which are incorporated herein by reference.

FIELD OF THE INVENTION

The invention relates to a method for preparing a solution B comprising at least one catalyst in at least one second solvent, comprising at least the steps of (A) providing a solution A comprising the at least one catalyst in at least one first solvent, (B) treating the solution A from step (A) with activated carbon, (C) removing the activated carbon from the solution A, and (D) exchanging the at least one first solvent in solution A for at least one second solvent in order to obtain the solution B comprising the at least one catalyst in at least one second solvent, to a corresponding solution of at least one catalyst in at least one second solvent, to the use of this solution for preparing a composition comprising the at least one catalyst, the at least one second solvent, at least one polyisocyanate and at least one NCO-reactive compound and the corresponding composition, to the use of the composition for preparing a single-layered or multi-layered coating system, to a process for the single-layered or multi-layered coating of a substrate with a coating system by applying the composition and to a substrate, coated with a single-layered or multi-layered coating system obtainable by the method according to the invention, characterized in particular in that the substrate is a chassis, preferably of a vehicle, in particular of a land vehicle, aircraft or watercraft, or a part thereof.

BACKGROUND OF THE INVENTION

WO 2011/051247 A1 and WO 2014/048854 A1 disclose a method for preparing Sn catalysts and the use thereof for preparing polyurethane coatings.

EP 2 493 899 A1 discloses a method for preparing metal compounds which are suitable as catalysts in the preparation of polyesters, polyurethanes or polysiloxanes. According to this document, the metal compounds obtained are colorless to yellowish and are stable on storage for several months.

EP 2 990 381 A1 and EP 2 274 092 A1 also disclose a method for preparing metal compounds which are suitable as catalysts in the preparation of polyurethanes. According to this method, alkali metal or alkaline earth metal stannates are reacted with appropriate* ligands. According to these documents, the desired metal compounds are obtained in sufficiently high purity without further purification.

According to WO 2014/131750 A1, Sn-containing catalysts are obtained by reacting elemental tin with ligands bearing hydroxyl groups. According to this document, a recrystallization step is described as purification method of the catalysts obtained.

Appropriate metal compounds, especially Sn-containing compounds, are used as latent, in particular thermolatent, catalysts for preparing single-layered or multi-layered coating systems. For this purpose, the catalysts are preferably present in non-polar solvents, for example butyl acetate. These solutions often have a slight yellow discoloration per se, which may well worsen on storage and/or particularly in contact with lacquer hardeners based on polyisocyanate, such that corresponding preparations are often unsuitable for qualitatively high-value applications, for example automotive paints.

SUMMARY OF THE INVENTION

Proceeding from this prior art, it was an object of the present invention to remedy at least one, preferably more than one, of the abovementioned disadvantages of the prior art. In particular, the object of the present invention is that of providing a solution of a catalyst, especially a thermolatent catalyst, which firstly has no discoloration after preparation, especially no yellow discoloration, and in addition also after storage does not form any discoloration, especially no yellow discoloration. The object is particularly that of providing a corresponding catalyst solution which has the lowest possible Hazen color number in accordance with DIN EN ISO 6271-2:2005-03. In addition, a method should be provided in accordance with the invention with which the solution specified can be obtained efficiently and in consistently high quality so that they are also reliably suitable for qualitatively demanding applications, for example automotive paints.

DETAILED DESCRIPTION OF THE INVENTION

These objects are achieved according to the invention by the method for preparing a solution B comprising at least one catalyst in at least one second solvent, comprising at least the following steps:

(A) providing a solution A comprising the at least one catalyst in at least one first solvent, (B) treating the solution A from step (A) with activated carbon, (C) removing the activated carbon from the solution A, and (D) exchanging the at least one first solvent in solution A for at least one second solvent in order to obtain the solution B, comprising the at least one catalyst in at least one second solvent.

In addition, the objects according to the invention are achieved by a solution of at least one catalyst in at least one second solvent, obtainable by the method according to the invention, by a solution comprising at least one catalyst in at least one second solvent, wherein the solution has a Hazen color number, measured spectrophotometrically in accordance with DIN EN ISO 6271-2:2005-03, of less than 500 APHA, preferably less than 200 APHA, particularly preferably less than 100 APHA, very particularly preferably less than 80 APHA, in particular less than 60 APHA, by the use of the solution according to the invention for preparing a composition comprising the at least one catalyst, the at least one second solvent, at least one polyisocyanate and at least one NCO-reactive compound, by a composition comprising at least one polyisocyanate, at least one NCO-reactive compound and a solution according to the invention, by the use of the composition according to the invention for preparing single-layered or multi-layered coating systems, by a process for single-layered or multi-layered coating of a substrate with a coating system by applying a composition according to the invention to the substrate, and also by a substrate, coated with a single-layered or multi-layered coating system, obtainable by the method according to the invention, wherein the substrate can be in particular a chassis, preferably of a vehicle, in particular of a land vehicle, aircraft or watercraft, or a part thereof.

The individual method steps of the method according to the invention are described in detail below.

Step (A) of the method according to the invention comprises providing a solution A comprising the at least one catalyst in at least one first solvent.

In general, any at least one catalyst known to those skilled in the art can be present in solution A in accordance with the invention. In a preferred embodiment of the present invention, the at least one catalyst is at least one thermolatent catalyst.

In particular, the at least one catalyst present in solution A is preferably a thermolatent catalyst comprising tin. Further preferably, the at least one catalyst is at least one cyclic tin compound of the general formula (I), (II), (III) or (IV):

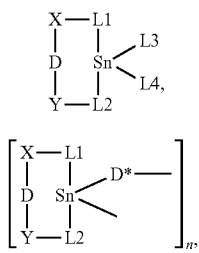

(I)

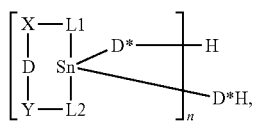

(II)

where n>1,

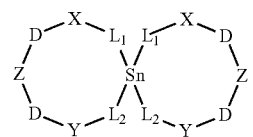

(III)

where n>1,

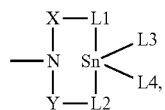

(IV)

where:
D represents —O—, —S— or —N(R1)—,
where R1 represents a saturated or unsaturated, linear or branched, aliphatic or cycloaliphatic or an optionally substituted aromatic or araliphatic radical having up to 20 carbon atoms, which may optionally comprise heteroatoms from the group of oxygen, sulfur and nitrogen, or represents hydrogen or the radical

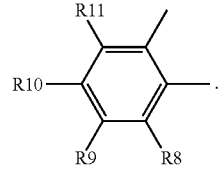

or R1 and L3 together represent —Z-L5-;
D* represents —O— or —S—;

X, Y and Z represent identical or different radicals selected from alkylene radicals of the formulae —C(R2)(R3)—, —C(R2)(R3)—C(R4)(R5)— or —C(R2)(R3)—C(R4)(R5)—C(R6)(R7)— or ortho-arylene radicals of the formulae

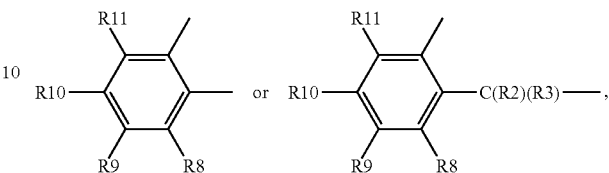

wherein R2 to R11 independently of one another represent saturated or unsaturated, linear or branched, aliphatic or cycloaliphatic or optionally substituted aromatic or araliphatic radicals having up to 20 carbon atoms, which may optionally comprise heteroatoms from the group of oxygen, sulfur and nitrogen, or represent hydrogen;

L1, L2 and L5 independently of one another represent —O—, —S—, —OC(=O)—, —OC(=S)—, —SC(=O)—, —SC(=S)—, —OS(=O)$_2$O—, —OS(=O)$_2$— or —N(R12)—, wherein R12 represents a saturated or unsaturated, linear or branched, aliphatic or cycloaliphatic radical or an optionally substituted aromatic or araliphatic radical having up to 20 carbon atoms and may optionally comprise heteroatoms from the group of oxygen, sulfur and nitrogen, or represents hydrogen;

L3 and L4 independently of one another represent —OH, —SH, —OR13, -Hal, —OC(=O)R14, —SR15, —OC(=S)R16, —OS(=O)$_2$OR17, —OS(=O)$_2$R18 or —NR19R20, or L3 and L4 together represent -L1-X-D-Y-L2-, wherein R13 to R20 independently of one another represent saturated or unsaturated, linear or branched, aliphatic or cycloaliphatic or optionally substituted aromatic or araliphatic radicals having up to 20 carbon atoms, which may optionally comprise heteroatoms from the group of oxygen, sulfur and nitrogen, or are hydrogen.

D* is preferably —O—.

X, Y and Z are preferably the alkenylene radicals —C(R2)(R3)—, —C(R2)(R3)—C(R4)(R5)— or the ortho-arylene radical

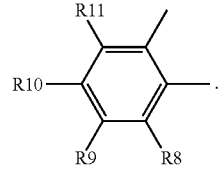

R2 to R7 are preferably hydrogen or alkyl, aralkyl, alkaryl or aryl radicals having up to 20 carbon atoms, particularly preferably hydrogen or alkyl, aralkyl, alkaryl or aryl radicals having up to 8 carbon atoms, very particularly preferably hydrogen or alkyl radicals having up to 8 carbon atoms, even further preferably hydrogen or methyl.

R8 to R11 are preferably hydrogen or alkyl radicals having up to 8 carbon atoms, particularly preferably hydrogen or methyl.

L1, L2 and L5 are preferably —NR12-, —S—, —SC(=S)—, —SC(=O)—, —OC(=S)—, —O—, or —OC(=O)—, particularly preferably —O—, or —OC(=O)—.

R12 is preferably hydrogen or an alkyl, aralkyl, alkaryl or aryl radical having up to 20 carbon atoms, particularly preferably hydrogen or an alkyl, aralkyl, alkaryl or aryl radical having up to 12 carbon atoms, very particularly preferably hydrogen or a methyl, ethyl, propyl, butyl, hexyl or octyl radical, wherein propyl, butyl, hexyl and octyl represent all isomeric propyl, butyl, hexyl and octyl radicals.

L3 and L4 are preferably -Hal, —OH, —SH, —OR13, —OC(═O)R14, wherein the R13 and R14 radicals have up to 20 carbon atoms, preferably up to 12 carbon atoms. L3 and L4 are particularly preferably Cl—, MeO—, EtO— PrO—, BuO—, HexO—, OctO—, PhO—, formate, acetate, propanoate, butanoate, pentanoate, hexanoate, octanoate, laurate, lactate or benzoate, wherein Pr, Bu, Hex and Oct represent all isomeric propyl, butyl, hexyl and octyl radicals, even further preferably Cl—, MeO—, EtO—, PrO— BuO—, HexO—, OctO—, PhO—, hexanoate, laurate or benzoate, wherein Pr, Bu, Hex and Oct represent all isomeric propyl, butyl, hexyl and octyl radicals.

R15 to R20 are preferably hydrogen or alkyl, aralkyl, alkaryl or aryl radicals having up to 20 carbon atoms, particularly preferably hydrogen or alkyl, aralkyl, alkaryl or aryl radicals having up to 12 carbon atoms, very particularly preferably hydrogen, methyl, ethyl, propyl, butyl, hexyl or octyl radicals, wherein propyl, butyl, hexyl and octyl represent all isomeric propyl, butyl, hexyl and octyl radicals.

The units L1-X, L2-Y and L5-Z preferably represent —CH$_2$CH$_2$O—, —CH$_2$CH(Me)O—, CH(Me)CH$_2$O—, CH$_2$C(Me)$_2$O—, —C(Me)$_2$ CH$_2$O— or —CH$_2$C(═O)O—.

The L1-X-D-Y-L2 unit preferably represents: HN[CH$_2$CH$_2$O—]$_2$, HN[CH$_2$CH(Me)O—]$_2$, HN[CH$_2$CH(Me)O—][CH(Me)CH$_2$O—], HN[CH$_2$C(Me)$_2$O—]$_2$, HN[CH$_2$C(Me)$_2$O—][C(Me)$_2$CH$_2$O—], HN[CH$_2$C(═O))—]$_2$, MeN[CH$_2$CH$_2$O—]$_2$, MeN[CH$_2$CH(Me)O—]$_2$, MeN[CH$_2$CH(Me)O—][CH(Me)CH$_2$O—], MeN[CH$_2$C(Me)$_2$O—]$_2$, MeN[CH$_2$C(Me)$_2$O—][C(Me)$_2$CH$_2$O—], MeN[CH$_2$C(═O)O—]$_2$, EtN[CH$_2$CH$_2$O—]$_2$, EtN[CH$_2$CH(Me)O—]$_2$, EtN[CH$_2$CH(Me)O—][CH(Me)CH$_2$O—], EtN[CH$_2$C(Me)$_2$O—]$_2$, EtN[CH$_2$C(Me)$_2$O—][C(Me)$_2$CH$_2$O—], EtN[CH$_2$C(═O)O—]$_2$, PrN[CH$_2$CH$_2$O—]$_2$, PrN[CH$_2$CH(Me)O—]$_2$, PrN[CH$_2$CH(Me)O—][CH(Me)CH$_2$O—], PrN[CH$_2$C(Me)$_2$O—]$_2$, PrN[CH$_2$C(Me)$_2$O—][C(Me)$_2$CH$_2$O—], PrN[CH$_2$C(═O)O—]$_2$, BuN[CH$_2$CH$_2$O—]$_2$, BuN[CH$_2$CH(Me)O—]$_2$, BuN[CH$_2$CH(Me)O—][CH(Me)CH$_2$O—], BuN[CH$_2$C(Me)$_2$O—]$_2$, BuN[CH$_2$C(Me)$_2$O—][C(Me)$_2$CH$_2$O—], BuN[CH$_2$C(═O)O—]$_2$, HexN[CH$_2$CH$_2$O—]$_2$, HexN[CH$_2$CH(Me)O—]$_2$, HexN[CH$_2$CH(Me)O—][CH(Me)CH$_2$O—], HexN[CHC(Me)$_2$O—]$_2$, HexN[CH2C(Me)$_2$O—][C(Me)$_2$CH$_2$O—], HexN[CH$_2$C(═O)O—]$_2$, OctN[CH$_2$CH$_2$O—]$_2$, OctN[CH$_2$CH(Me)O]$_2$, OctN[CH$_2$CH(Me)O—][CH(Me)CH$_2$O—], OctN[CH$_2$C(Me)$_2$O—]$_2$, OctN[CH$_2$C(Me)$_2$O—][C(Me)$_2$CH$_2$O—], OctN[CH$_2$C(═O)O—]$_2$, wherein Pr, Bu, Hex and Oct can represent all isomeric propyl, butyl, hexyl and octyl radicals, PhN[CH$_2$CH$_2$O—]$_2$, PhN[CH$_2$CH(Me)O—]$_2$, PhN[CH$_2$CH(Me)O—][CH(Me)CH$_2$O—], PhN[CH$_2$C(Me)$_2$O—]$_2$, PhN[CH$_2$C(Me)$_2$O—][C(Me)$_2$CH$_2$O—], PhN[CH$_2$C(═O)O—]$_2$.

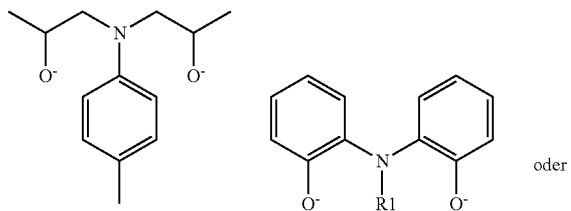 oder

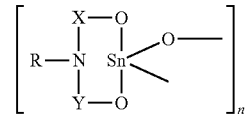

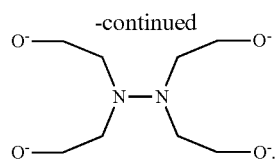

As is known to those skilled in the art the tin compounds have a propensity for oligomerization and therefore polynuclear tin compounds or mixtures of mono- and polynuclear tin compounds are often present. In the polynuclear tin compounds the tin atoms are preferably connected to one another via oxygen atoms ('oxygen bridges', vide intra). Typical oligomeric complexes (polynuclear tin compounds) form for example through condensation of the tin atoms via oxygen or sulfur, for example $$\left[ \begin{array}{c} X\text{—}O \\ | \\ R\text{—}N\quad Sn \\ | \\ Y\text{—}O \end{array} \begin{array}{c} O\text{——} \\ \end{array} \right]_n$$

where n>1 (cf. formula II). Cyclic oligomers are frequently encountered in the case of low degrees of oligomerization, linear oligomers with OH or SH end groups in the case of high degrees of oligomerization (cf. formula III).

According to one particularly preferred embodiment of the present invention, the thermolatent catalyst is selected from the group of mono- or polycyclic tin compounds of the type:

1,1-di-"R"-5-"organyl"-5-aza-2,8-dioxa-1-stannacyclooctane, 1,1-di-"R"-5-(N-"organyl")aza-3,7,-di-"organyl"-2,8-dioxa-1-stannacyclooctane, 1,1-di-"R"-5-(N-"organyl")aza-3,3,7,7-tetra-"organyl"-2,8-dioxa-1-stannacyclooctane, 4,12-di-"organyl"-1,7,9,15-tetraoxa-4,12-diaza-8-stannaspiro[7.7]pentadecane, 4,12-di-"organyl"-2,6,10,14-tetra-"organyl"-1,7,9,15-tetraoxa-4,12-diaza-8-stannaspiro[7.7]pentadecane, 4,12-di-"organyl"-2,2,6,6,10,10,14,14-octa-"organyl"-1,7,9,15-tetraoxa-4,12-diaza-8-stannaspiro[7.7]pentadecane, where, independently of one another, "R" represents D*, L3 or L4, as defined above, and "organyl" represents R1, as defined above.

According to a highly preferred embodiment of the invention, the thermolatent catalyst is selected from the group consisting of 4,12-di-n-butyl-1,7,9,15-tetraoxa-4,12-diaza-8-stannaspiro[7.7]pentadecane, 4,12-di-n-butyl-2,6,10,14-tetramethyl-1,7,9,15-tetraoxa-4,12-diaza-8-stannaspiro [7.7]pentadecane, 2,4,6,10,12,14-hexamethyl-1,7,9,15-tetraoxa-4,12-diaza-8-stannaspiro [7.7]pentadecane, 4,12-di-n-octyl-2,6,10,14-tetramethyl-1,7,9,15-tetraoxa-4,12-diaza-8-stannaspiro [7.7]pentadecane, 4,12-di-n-octyl-1,7,9,15-tetraoxa-4,12-diaza-8-stannaspiro [7.7]pentadecane, 4,12-dimethyl-1,7,9,15-tetraoxa-4,12-diaza-8-stannaspiro [7.7] pentadecane, 1,1-dichloro-5-methyl-5-aza-2,8-dioxa-1-stannacyclooctane and mixtures thereof.

Methods for preparing catalysts of this kind are known per se to those skilled in the art and are described for example in EP 2 900 716 A1, EP 2 900 717 A1, EP 2 772 496 A1, EP 14182806, J. Organomet. Chem. 2009, 694, pages 3184 to 3189, Chem. Heterocycl. Comp. 2007, 43, pages 813 to 834, *Indian J. Chem.* 1967, 5, pages 643 to 645, and in the literature cited therein.

Step (A) is preferably carried out by reacting one tin-containing precursor compound, in particular a tin(IV) salt, in the at least one first solvent to give the at least one catalyst.

The concentration of the at least one tin-containing precursor compound in the at least one first solvent is preferably 2 to 60% by weight, based on the total solution A.

In step (A) of the method according to the invention, the at least one catalyst is present in at least one first solvent. In this case, one first solvent is used in accordance with the invention, or a mixture of first solvents is used. In accordance with the invention, one first solvent is preferably used.

In accordance with the invention, the first solvent used is preferably a solvent having a boiling point of 40 to 100° C., particularly preferably 50 to 80° C., in each case at 1 bar(a).

The at least one first solvent is particularly preferably selected from the group consisting of alcohols, preferably methanol, ethanol, propanol, in particular isopropanol, or mixtures thereof, ethers, preferably diethyl ether, tetrahydrofuran, tert-butyl methyl ether or mixtures thereof, halogenated solvents, preferably dichloromethane, chloroform or mixtures thereof, and mixtures thereof.

The at least one catalyst can be present in the at least one first solvent at any concentration deemed suitable to those skilled in the art. The concentration of the at least one catalyst in the at least one first solvent is preferably 0.1 to 80% by weight, particularly preferably 1 to 50% by weight, very particularly preferably 2 to 20% by weight, in particular preferably 5 to 20% by weight, based in each case on the total solution A.

Solution A generally comprises the at least one catalyst, the at least one first solvent and possibly impurities such as water, for example to an extent of up to 0.5% by weight, ligands from the catalyst preparation, for example N-organyldialkanolamines, in particular N-butyldiisopropylamine, sodium chloride etc. Preferably present in solution A is only the at least one catalyst, preferably one catalyst, and the at least one first solvent, preferably one first solvent.

In accordance with the invention, impurities possibly present can be removed by purification steps known to those skilled in the art, for example filtration and the like.

In a preferred embodiment of the method according to the invention, the solution provided in step (A) is transferred to step (B) without further intermediate steps. In a further preferred embodiment of the method according to the invention, solution A comprising the at least one catalyst in at least one first solvent is treated prior to step (B), i.e. after step (A), for at least 6 h at a temperature of at least −10° C.

This treatment can generally be carried out in any apparatus deemed suitable to those skilled in the art, for example in a tank, stirred vessel, container, reaction vessel etc.

The treatment is generally carried out for at least 6 h, preferably for at least 12 h, further preferably for at least 24 h. The treatment is generally carried out for at most 168 h, preferably for at most 48 h.

The treatment is generally carried out at a temperature of at least −10° C., preferably at 10 to 80° C., particularly preferably at 15 to 60° C., very particularly preferably at room or ambient temperature.

Solution A can be stirred during this treatment in any manner known to those skilled in the art. In a second embodiment, solution A is not stirred during this treatment.

Step (B) of the method according to the invention comprises treating the solution A from step (A) with activated carbon.

In the context of the present invention, "treating the solution A from step (A) with activated carbon" is understood to mean that solution A is brought into contact with activated carbon. This bringing into contact can take place in accordance with the invention in any manner deemed suitable to those skilled in the art, for example introducing activated carbon into the solution A or perfusing activated carbon with solution A.

Step (B) of the method according to the invention is preferably carried out at a temperature and a pressure at which the at least one first solvent is liquid. The temperature in step (B) is therefore preferably −10 to 80° C., particularly preferably 10 to 60° C. The pressure in step (B) is therefore preferably 0.5 to 7 bar(a), particularly preferably 0.8 to 2 bar(a) and very particularly preferably 1 to 1.5 bar(a).

In step (B) of the method according to the invention, the solution A is generally treated with a sufficiently large amount of activated carbon. In step (B), activated carbon is preferably used in an amount of 1 to 100 g/100 g of solution A, particularly preferably 2 to 12 g/100 g of solution A.

The activated carbon used in step (B) of the method according to the invention preferably has a specific surface area of 400 to 2500 $m^2/g$, measured according to the BET method in accordance with DIN ISO 9277:2003-05. Preference is given to using activated carbon based on coconut shells or carbon, particularly preferably based on coconut shells.

Step (B) of the method according to the invention is preferably carried out until the solution has a desired Hazen color number. Particularly preferably, step (B) is carried out for up to 48 h, particularly preferably for up to 24 h, in particular preferably for up to 12 h, very particularly preferably for up to 4 h. Step (B) of the method according to the invention is preferably carried out for at least 2 hours, particularly preferably for at least 3 hours. Further preferably, the Hazen color number, measured spectrophotometrically in accordance with DIN EN ISO 6271-2:2005-03, of the solution obtained in step (B) is less than 500 APHA, preferably less than 200 APHA, particularly preferably less than 100 APHA, very particularly preferably less than 80 APHA, in particular less than 60 APHA. The Hazen color number, measured spectrophotometrically in accordance with DIN EN ISO 6271-2:2005-03 is in this case* preferably less than 1 APHA.

Step (C) of the method according to the invention comprises removing the activated carbon from the* solution A.

Step (C) of the method according to the invention can generally be carried out in any manner known to those skilled in the art.

For the preferred embodiment that step (B) of the method according to the invention is carried out by introducing the activated carbon into solution A, step (C) of the method according to the invention is preferably carried out by filtration or by decanting.

For the further embodiment according to the invention that step (B) of the method according to the invention is carried out in that the solution A flows through the activated carbon, step (C) of the method according to the invention is preferably carried out by the activated carbon being separated by means of a suitable apparatus, for example a funnel or a Nutsche filter, after the activated carbon has been perfused with solution A.

It is also possible in accordance with the invention that at least part of the solution A is circulated, i.e. that the solution A repeatedly flows through the activated carbon. Suitable apparatuses for this purpose are known per se to those skilled in the art.

Step (C) of the method according to the invention is preferably carried out at a temperature and a pressure at which the at least one first solvent is liquid. The temperature in step (C) is therefore preferably −10 to 80° C., particularly preferably 10 to 60° C. The pressure in step (C) is therefore preferably 0.5 to 7 bar(a), particularly preferably 0.8 to 2 bar(a) and very particularly preferably 1 to 1.5 bar(a).

Step (D) of the method according to the invention comprises exchanging the at least one first solvent in solution A for at least one second solvent in order to obtain the solution B, comprising the at least one catalyst in at least one second solvent.

In general in step (D) of the method according to the invention, any at least one second solvent deemed suitable to those skilled in the art can be used. In this case, one second solvent is used in accordance with the invention, or a mixture of second solvents is used. In accordance with the invention, one second solvent is preferably used.

In accordance with the invention, the at least one second solvent preferably has a boiling point of 80 to 180° C., particularly preferably 100 to 140° C., in each case at 1 bar(a).

In accordance with the invention, the at least one first solvent and the at least one second solvent are preferably different.

It is further preferred in accordance with the invention if the boiling point of the at least one second solvent is higher, preferably at least 10° C. higher, particularly preferably at least 30° C. higher, than the boiling point of the at least one first solvent.

The present invention preferably relates to the method according to the invention wherein the at least one second solvent is selected from the group consisting of esters, preferably butyl acetate, in particular n-butyl acetate, ethyl acetate, ethylene glycol diacetate, 2-methoxypropyl acetate or mixtures thereof, aromatic solvents, preferably benzene, toluene, xylols or mixtures thereof, lactones, preferably butyrolactone or mixtures thereof, carbonates, preferably diethyl carbonate, propylene carbonate, ethylene carbonate or mixtures thereof.

Step (D) of the method according to the invention comprises exchanging the at least one first solvent for the at least one second solvent.

Methods for such a solvent exchange are known per se to those skilled in the art. For example, step (D) of the method according to the invention can be carried out by removing the at least one first solvent at reduced pressure and/or elevated temperature in order to obtain the at least one catalyst in solid form. A suitable pressure is, for example, 0.001 bar(a) to 5 bar(a). A suitable temperature is, for example, 20 to 150° C. The solid catalyst thus obtained is subsequently dissolved in the at least one second solvent, optionally at elevated temperature.

In a further embodiment according to the invention, step (D) can be carried out by firstly removing the at least one first solvent at reduced pressure and/or elevated temperature, for example 0.001 to 5 bar(a) and/or 20 to 150° C., while at the same time adding the at least one second solvent, which preferably has a higher boiling point than the at least one first solvent.

In a further embodiment according to the invention, step (D) can be carried out by adding firstly the at least one second solvent, which preferably has a higher boiling point than the at least one first solvent, at least partly to the mixture obtained in step (C) and then removing the at least one first solvent at reduced pressure and/or elevated temperature, for example 0.001 to 5 bar(a) and/or 20 to 150° C., optionally with further addition of the second solvent.

The exchange of the at least one first solvent for the at least one second solvent can also be carried out in accordance with the invention by selecting the at least one first solvent and the at least one second solvent such that, owing to the different solubility of the at least one catalyst in the two solvents and the densities of the two solvents, on bringing the mixture comprising the at least one catalyst and the at least one first solvent into contact with the at least one second solvent, the at least one catalyst at least partially migrates into the at least one second solvent and, owing to a miscibility gap, two phases are formed. These can be separated from each other, for example by decanting, in order to obtain the solution B.

After step (D) of the method according to the invention, solution B is obtained comprising at least one catalyst in at least one second solvent.

Solution B comprises the at least one catalyst in an amount of, for example, 3 to 45% by weight, preferably 15 to 25% by weight, based in each case on the total solution B.

By means of the method according to the invention, in particular by the fact that the solution is purified with activated carbon at the stage in which the at least one catalyst is present in at least one first solvent, a corresponding solution B in at least one second solvent can be obtained which has no discoloration, in particular no yellow discoloration. In addition, a solution B is obtained in accordance with the invention which, even on storage under an inert gas atmosphere at a temperature below 60° C. over a period of several days, preferably several weeks, develops no discoloration, in particular no yellow discoloration.

The present invention therefore also relates to the solution of at least one catalyst in at least one second solvent, obtainable by the method according to the invention.

In addition, the present invention relates to the solution according to the invention comprising at least one catalyst in at least one second solvent, wherein the solution has a Hazen color number, measured spectrophotometrically in accordance with DIN EN ISO 6271-2:2005-03, of less than 500 APHA, preferably less than 200 APHA, particularly preferably less than 100 APHA, very particularly preferably less than 80 APHA, in particular less than 60 APHA. The Hazen color number, measured spectrophotometrically in accordance with DIN EN ISO 6271-2:2005-03 is in this case preferably less than 1 APHA.

Preferably, the present invention relates to the solution according to the invention, wherein the Hazen color number of the solution, measured spectrophotometrically in accordance with DIN EN ISO 6271-2:2005-03, on storage under an inert gas atmosphere at a temperature of 30° C. over a period of 10 weeks changes by less than 200 APHA, preferably less than 100 APHA and particularly preferably less than 50 APHA.

With respect to the at least one second solvent present in the solution according to the invention, what has been said about the method according to the invention applies accordingly.

Preferably, the present invention relates to the solution according to the invention, wherein the at least one catalyst is at least one cyclic tin compound of the general formula (I), (II), (III) or (IV):

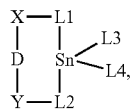
(I)

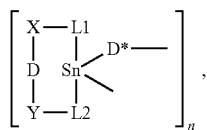
(II)

where n>1,

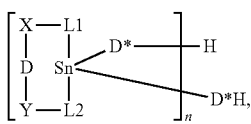
(III)

where n>1,

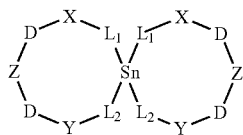
(IV)

where:

D represents —O—, —S— or —N(R1)—, where R1 represents a saturated or unsaturated, linear or branched, aliphatic or cycloaliphatic or an optionally substituted aromatic or araliphatic radical having up to 20 carbon atoms, which may optionally comprise heteroatoms from the group of oxygen, sulfur and nitrogen, or represents hydrogen or the radical

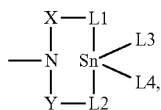

or R1 and L3 together represent —Z-L5-;

D* represents —O— or —S—;

X, Y and Z represent identical or different radicals selected from alkylene radicals of the formulae —C(R2)(R3)—, —C(R2)(R3)—C(R4)(R5)— or —C(R2)(R3)—C(R4)(R5)—C(R6)(R7)— or ortho-arylene radicals of the formulae

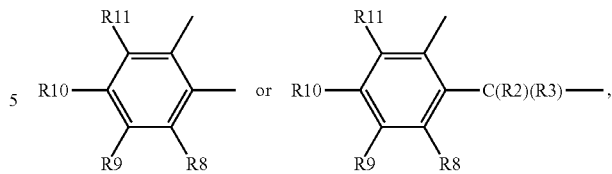

wherein R2 to R11 independently of one another represent saturated or unsaturated, linear or branched, aliphatic or cycloaliphatic or optionally substituted aromatic or araliphatic radicals having up to 20 carbon atoms, which may optionally comprise heteroatoms from the group of oxygen, sulfur and nitrogen, or represent hydrogen;

L1, L2 and L5 independently of one another represent —O—, —S—, —OC(=O)—, —OC(=S)—, —SC(=O)—, —SC(=S)—, —OS(=O)$_2$O—, —OS(=O)$_2$— or —N(R12)—, wherein R12 represents a saturated or unsaturated, linear or branched, aliphatic or cycloaliphatic radical or an optionally substituted aromatic or araliphatic radical having up to 20 carbon atoms, which may optionally comprise heteroatoms from the group of oxygen, sulfur and nitrogen, or represents hydrogen;

L3 and L4 independently of one another represent —OH, —SH, —OR13, -Hal, —OC(=O)R14, —SR15, —OC(=S)R16, —OS(=O)$_2$OR17, —OS(=O)$_2$R18 or —NR19R20, or L3 and L4 together represent —L1-X-D-Y-L2-, wherein R13 to R20 independently of one another represent saturated or unsaturated, linear or branched, aliphatic or cycloaliphatic or optionally substituted aromatic or araliphatic radicals having up to 20 carbon atoms, which may optionally comprise heteroatoms from the group of oxygen, sulfur and nitrogen, or represent hydrogen.

With respect to the preferred embodiments of the at least one catalyst, what has been said about the method according to the invention applies accordingly. In the solution according to the invention, the at least one catalyst is present in an amount of, for example, 3 to 40% by weight, preferably 15 to 25% by weight, based in each case on the total solution.

The present invention also relates to the use of the solution according to the invention for preparing a composition comprising the at least one catalyst, the at least one second solvent, at least one polyisocyanate and at least one NCO-reactive compound.

Suitable catalysts and second solvents in accordance with the invention have already been described with respect to the method according to the invention. Suitable NCO-reactive compounds in accordance with the invention are described, for example, in WO 2017/182429 A1 and in particular are selected from the group consisting of low molecular weight diols, e.g. 1,2-ethanediol, 1,3- or 1,2-propanediol, 1,4-butanediol, triols, e.g. glycerol, trimethylolpropane, tetraols e.g. pentaerythritol, short-chain polyamines, polyhydroxy compounds such as polyether polyols, polyester polyols, polyurethane polyols, polysiloxane polyols, polycarbonate polyols, polyether polyamines, polybutadiene polyols, polyacrylate polyols, polymethacrylate polyols, mixed polymers thereof, and mixtures thereof.

The polyhydroxyl compounds preferably have mass-average molecular weights Mw>500 daltons, measured by means of gel permeation chromatography (GPC) against a polystyrene standard, particularly preferably between 800 and 100 000 daltons, in particular between 1000 and 50 000 daltons.

The polyhydroxyl compounds preferably have an OH number of 30 to 400 mg KOH/g, in particular between 100 and 300 KOH/g. The hydroxyl number (OH number) indicates how many mg of potassium hydroxide are equivalent to the amount of acetic acid bound by 1 g of substance in the acetylation. In the determination, the sample is boiled with acetic anhydride/pyridine, and the acid formed is titrated with potassium hydroxide solution (DIN 53240-2).

The glass transition temperatures, measured with the aid of DSC measurements according to DIN EN ISO 1 1357-2, of the polyhydroxyl compounds are preferably between −150 and 100° C., particularly preferably between −120° C. and 80° C.

Suitable polyisocyanates in accordance with the invention are described, for example, in WO 2017/182429 A1 and are preferably selected from the group consisting of di- or triisocyanates, for example butane 1,4-diisocyanate, pentane 1,5-diisocyanate (pentamethylene diisocyanate, PDI), hexane 1,6-diisocyanate (hexamethylene diisocyanate, HDI), 4-isocyanatomethyloctane 1,8-diisocyanate (triisocyanatononane, TIN), 4,4'-methylenebis(cyclohexyl isocyanate) ($H_{12}$MDI), 3,5,5-trimethyl-1-isocyanato-3-isocyanatomethylcyclohexane (isophorone diisocyanate, IPDI), 1,3- and 1,4-bis(isocyanatomethyl)cyclohexane ($H_6$XDI), naphthalene 1,5-diisocyanate, diisocyanatodiphenylmethane (2,2'-, 2,4'- and 4,4'-MDI or mixtures thereof), diisocyanatomethylbenzene (toluylene 2,4- and 2,6-diisocyanate, TDI) and technical grade mixtures of the two isomers, and also 1,3- and/or 1,4-bis(isocyanatomethyl)benzene (XDI), 3,3'-dimethyl-4,4'-biphenyl diisocyanate (TODI), paraphenylene 1,4-diisocyanate (PPDI) and cyclohexyl diisocyanate (CHDI) and the oligomers of higher molecular weight that are obtainable individually or in a mixture from the above and have biuret, uretdione, isocyanurate, iminooxadiazinedione, allophanate, urethane and carbodiimide/uretonimine structural units, and mixtures thereof.

Preference is given to the use of polyisocyanates based on aliphatic and cycloaliphatic diisocyanates. The present invention therefore relates in addition to the composition according to the invention comprising at least one polyisocyanate, at least one NCO-reactive compound and a solution according to the invention, i.e. the solution B according to the invention.

The present invention also relates to the use of the composition according to the invention for preparing single-layered or multi-layered coating systems.

The present invention relates in addition to a process for single-layered or multi-layered coating of a substrate with a coating system by applying a composition according to the invention to the substrate.

The present invention also relates to the substrate, coated with a single-layered or multi-layered coating system, comprising a composition according to the invention and/or obtainable by the method according to the invention, characterized in particular in that the substrate is a chassis, preferably of a vehicle, in particular of a land vehicle, aircraft or watercraft, or a part thereof.

EXAMPLES

The Hazen color number was measured by spectrophotometry according to DIN EN ISO 6271-2:2005-03 with a LICO 400 spectrophotometer from Lange, Germany. 4,12-Di-n-butyl-2,6,10,14-tetramethyl-1,7,9,15-tetraoxa-4,12-diaza-8-stannaspiro [7.7]pentadecane was used as catalyst.

Example 1

A catalyst mixture consisting of 61 kg of methanol and 12.7 kg of catalyst was heat-treated at 10° C. for 24 h in a stirred tank and subsequently circulated for 24 h over 6 kg of activated carbon based on coconut shells. Over the experimental period, the coloring of the catalyst solution was slowly reduced to a color value of 16 APHA.

Subsequently, 175 kg of butyl acetate was added to the solution and the methanol and part of the butyl acetate were removed at a maximum of 24° C. by a one-stage distillation under vacuum. The resulting catalyst solution had a catalyst content of 10.4% by weight and a color value of 16 APHA.

After temperature-controlled storage at 50° C., the sample showed after 10 days a color number of 18 APHA.

After temperature-controlled storage at 50° C., the sample showed after 69 days a color number of 150 APHA.

Example 2

A catalyst mixture consisting of 66 kg of methanol and 12.6 kg of catalyst, after preparation of the catalyst, was circulated for 24 h over 6 kg of activated carbon based on coconut shells. Over the experimental period, the coloring of the catalyst solution was slowly reduced to a color value of 42 APHA.

Subsequently, 175 kg of butyl acetate was added to the solution and the methanol and part of the butyl acetate were removed at a maximum of 27° C. by a one-stage distillation under vacuum. The resulting catalyst solution had a catalyst content of 11.96% by weight and a colour value of 42 APHA.

After a storage period of 97 h at room temperature, a color number of 342 APHA could be measured.

Example 3

A catalyst mixture consisting of 66 kg of methanol and 11.5 kg of catalyst, after preparation of the catalyst, was heat-treated for 24 h and then circulated for 24 h over 6 kg of activated carbon based on coconut shells. Over the experimental period, the coloring of the catalyst solution was slowly reduced to a color value of 33 APHA. Table 1 shows the time-dependent decrease of the color of the solution:

TABLE 1

| Time [h] | 0 | 4 | 8 | 12 | 16 | 20 | 24 |
|---|---|---|---|---|---|---|---|
| APHA | 81 | 46 | 41 | 40 | 36 | 32 | 33 |

Subsequently, 175 kg of butyl acetate was added to the solution and the methanol and part of the butyl acetate were removed at a maximum of 24° C. by a one-stage distillation under vacuum. The resulting catalyst solution had a catalyst content of 9.7% by weight and a color value of 33 APHA.

Example 4

Treatment of a catalyst solution in MeOH with activated carbon

A catalyst mixture consisting of 100 kg of methanol and 14.72 kg of catalyst (12.83%) was heat-treated at 10° C. for 24 h in a stirred tank and subsequently circulated for 24 h over 6 kg of activated carbon based on coconut shells. Over the experimental period, the coloring of the catalyst solution of 248 APHA was reduced to a color value of 69 APHA. The catalyst concentration obtained after the decolorization was 12.22%. The yield based on the catalyst was 95.2%.

Comparative Example 5

Treatment of a catalyst solution in butyl acetate with activated carbon as a comparison For comparison with example 4, a catalyst mixture consisting of 100 kg of butyl acetate and 11.08 kg of catalyst (9.97%) was heat-treated at 10° C. for 24 h in a stirred tank and subsequently circulated for 24 h over 6 kg of activated carbon based on coconut shells. Over the experimental period, the coloring of the catalyst solution of 145 APHA was reduced to a color value of 60 APHA. The catalyst concentration obtained after the decolorization was 7.7%. The yield based on the catalyst was 78.0%.

The invention claimed is:

1. A method for preparing a solution B comprising at least one catalyst in at least one second solvent, comprising the following steps:
   (A) providing a solution A comprising the at least one catalyst in at least one first solvent,
   (B) combining the solution A from step (A) with activated carbon,
   (C) removing the activated carbon from the solution A, and
   (D) exchanging the at least one first solvent in solution A for at least one second solvent to obtain the solution B, comprising the at least one catalyst in at least one second solvent,
wherein the at least one catalyst is at least one cyclic tin compound of the formula (I), (II), (III), or (IV);

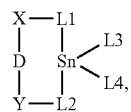
(I)

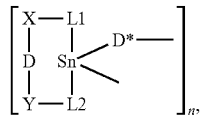
(II)

where n>1,

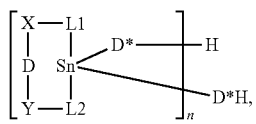
(III)

where n>1,

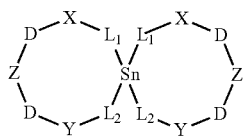
(IV)

where;
D represents —O—, —S— or —N(R1)—,
where R1 represents a saturated or unsaturated, linear or branched aliphatic or cycloaliphatic or an optionally substituted aromatic or araliphatic radical having up to 20 carbon atoms, which may optionally comprise heteroatoms from the group of oxygen, sulfur and nitrogen, or represents hydrogen or the radical

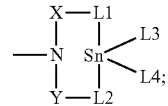

D* represents —O— or —S—;
X, Y and Z represent identical or different radicals selected from alkylene radicals of the formulae —C(R2)(R3)—, —C(R2)(R3)—C(R4)(R5)- or —C(R2)(R3)—C(R4)(R5)—C(R6)(R7)- or ortho-arylene radicals or the formulae

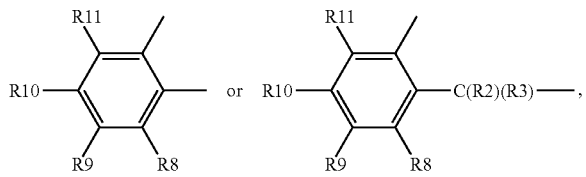

wherein R2 to R11 independently of one another represent saturated or unsaturated, linear or branched, aliphatic or cycloaliphatic or optionally substituted aromatic or araliphatic radicals having up to 20 carbon atoms, which may optionally comprise heteroatoms from the group of oxygen sulfur and nitrogen, or are hydrogen,
L1 and L2 independently of one another represent —O—, —S—, —OC(=O)—, —SC(=O)—, —SC(=S)—, —OS(=O)$_2$O—, —OS(=O)$_2$— or —N(R12)—,
wherein R12 represents a saturated or unsaturated, linear or branched, aliphatic or cycloaliphatic or an optionally substituted aromatic or araliphatic radical having up to 20 carbon atoms and may optionally comprise heteroatoms from the group of oxygen, sulfur and nitrogen, or represents hydrogen;
L3 and L4 independently of one another represent —OH, —SH, —OR13, —Hal, —OC(=O)R14, —SR15, —OC(=S)R16, —OS(=O)$_2$OR17, —OS(=O)$_2$R18 or —NR19R20, or L3 and L4 together represent -L1-X-D-Y-L2-,
wherein R13 to R20 independently of one another represent saturated or unsaturated linear or branched, aliphatic or cycloaliphatic or optionally substituted aromatic or araliphatic radicals having up to 20 carbon atoms, which may optionally comprise heteroatoms from the group of oxygen, sulfur and nitrogen, or are hydrogen.

2. The method according to claim 1, wherein the at least one catalyst is at least one thermolatent catalyst.

3. The method according to claim 1, wherein solution A comprising the at least one catalyst in at least one first solvent is treated prior to step (B) for at least 6 hours at a temperature of at least 10° C.

4. The method according to claim 1, wherein step (A) is carried out by reacting at least one tin-containing precursor compound in the at least one first solvent to give the at least one catalyst.

5. The method according to claim 4, wherein the concentration of the at least one tin-containing precursor compound in the at least one first solvent is 2 to 60% by weight, based on the total solution A.

6. The method according to claim 1, wherein the boiling point of the at least one second solvent is higher than the boiling point of the at least one first solvent.

7. The method according to claim 1, wherein the at least one first solvent is selected from the group consisting of alcohols, ethers, halogenated solvents, and mixtures thereof.

8. The method according to claim 1, wherein the at least one second solvent is selected from the group consisting of esters, aromatic solvents, lactones, carbonates, and mixtures thereof.

9. A solution of at least one catalyst in at least one second solvent, obtained by the method according to claim 1.

10. The solution according to claim 9, having a Hazen color number, measured spectrophotometrically in accordance with DIN EN ISO 6271-2:2005-03, of less than 500 APHA.

11. The solution according to claim 9, wherein the Hazen color number, measured spectrophotometrically in accordance with DIN EN ISO 6271-2:2005-03, on storage under an inert gas atmosphere at a temperature of 30° C. over a period of 10 weeks changes by less than 200 APHA.

12. A composition comprising at least one polyisocyanate, at least one NCO-reactive compound and the solution according to claim 9.

13. A method for a single-layered or a multi-layered coating of a substrate comprising applying the composition according to claim 12 to the substrate.

14. A substrate, coated with a single-layered or a multi-layered coating system, comprising the composition according to claim 12, wherein the substrate is a chassis or a vehicle selected from the group consisting of a land vehicle, an aircraft, a watercraft.

* * * * *